United States Patent [19]

Wersosky

[11] Patent Number: 4,621,995

[45] Date of Patent: Nov. 11, 1986

[54] MULTIPLE ZONE HEATING OF MOLDS

[75] Inventor: John M. Wersosky, Dover, N.H.

[73] Assignee: Ex-Cell-O Corporation, Troy, Mich.

[21] Appl. No.: 789,197

[22] Filed: Oct. 18, 1985

[51] Int. Cl.[4] .................. B29C 41/18; B29C 41/46
[52] U.S. Cl. .................. 425/144; 137/625.33;
  264/302; 264/327; 425/DIG. 60; 425/185;
  425/435
[58] Field of Search .......... 425/144, 160, 143, 141,
  425/547, 552, 425, 429, 435, 185; 55/418;
  137/625.33, 625.48; 264/302, 327, DIG. 60;
  249/79, 133

[56] References Cited

U.S. PATENT DOCUMENTS

| | | | |
|---|---|---|---|
| 2,588,571 | 3/1952 | Porter | 264/302 |
| 3,002,230 | 10/1961 | Stewart | 264/46.6 |
| 3,315,016 | 4/1967 | Wersosky et al. | 264/337 |
| 3,388,429 | 6/1968 | Barnett et al. | 425/144 |
| 3,416,193 | 12/1968 | Freeborn | 425/143 |
| 3,492,307 | 1/1970 | Hoskinson | 264/302 |
| 3,578,066 | 5/1971 | Vox | 165/27 |
| 3,590,435 | 7/1971 | Dunham et al. | 425/73 |
| 3,680,629 | 8/1972 | Gaudreau et al. | 249/79 |
| 3,728,429 | 4/1973 | Colby et al. | 264/302 |
| 4,389,177 | 6/1983 | Colby | 425/144 |

Primary Examiner—Jay H. Woo
Assistant Examiner—James C. Housel
Attorney, Agent, or Firm—John C. Evans

[57] ABSTRACT

A molding machine has a valve assembly that includes means for selectively heating or cooling a mold by controlling flow of gas through an array of gas impingement jets disposed adjacent the backside of a mold surface to regulate the temperature over respective first and second areas of the mold surface. Gas heating and cooling circuits include two drive cylinder regulated plate valves for supplying gas at the gas impingement jet nozzles associated with the mold.

5 Claims, 14 Drawing Figures

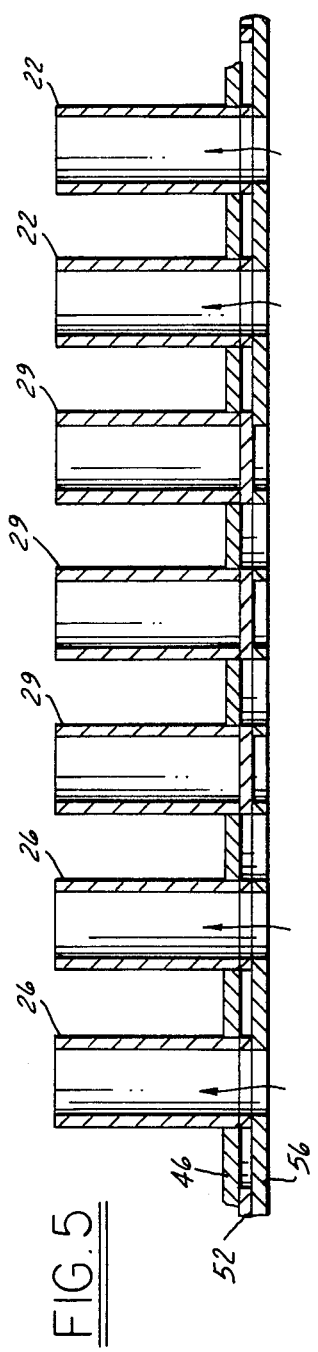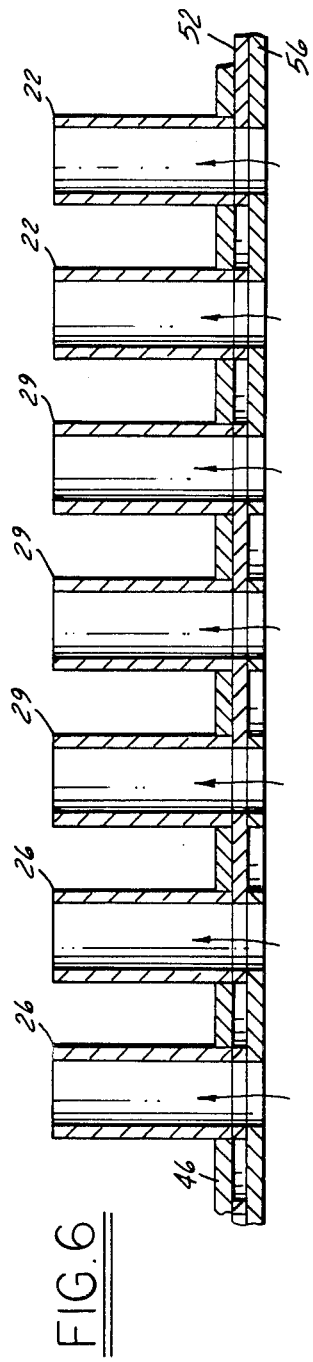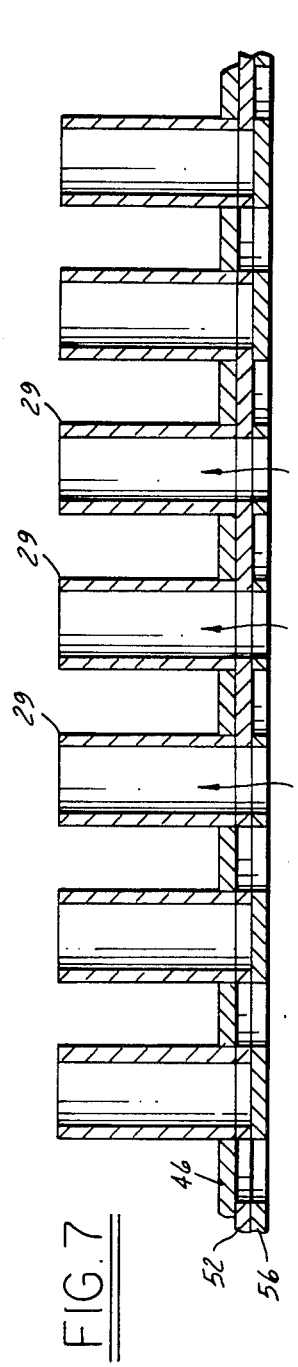

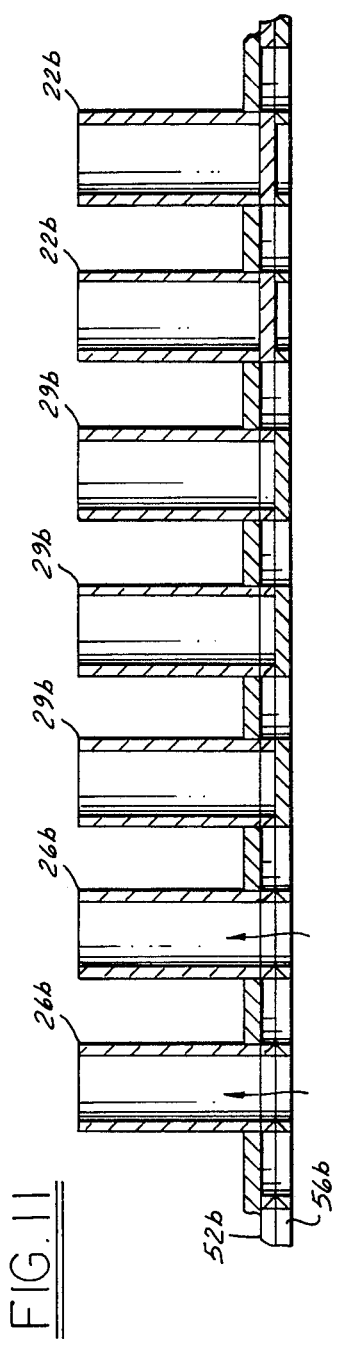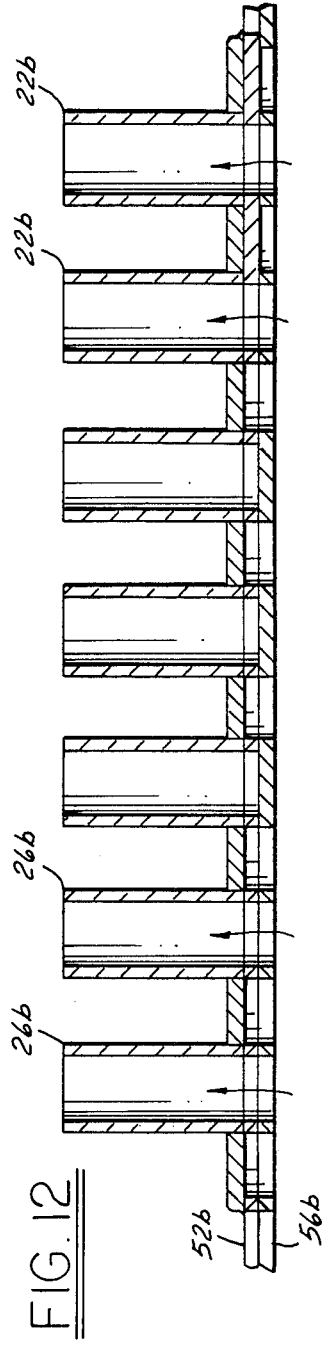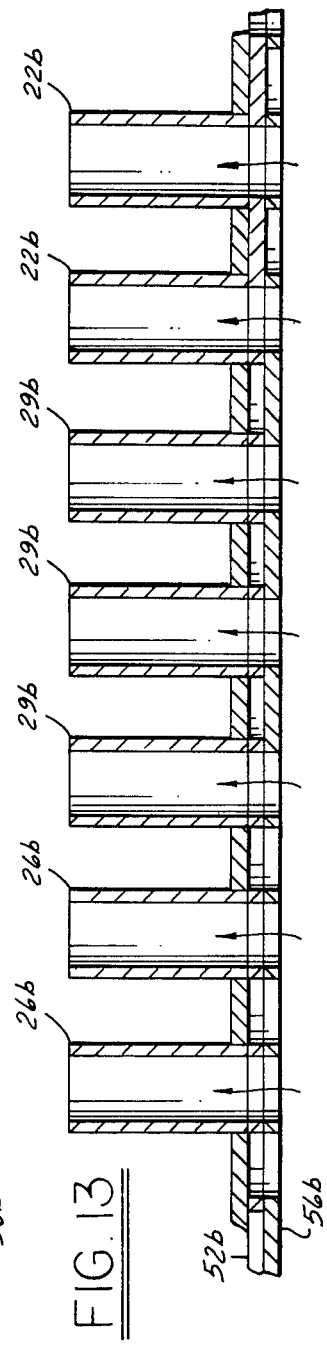

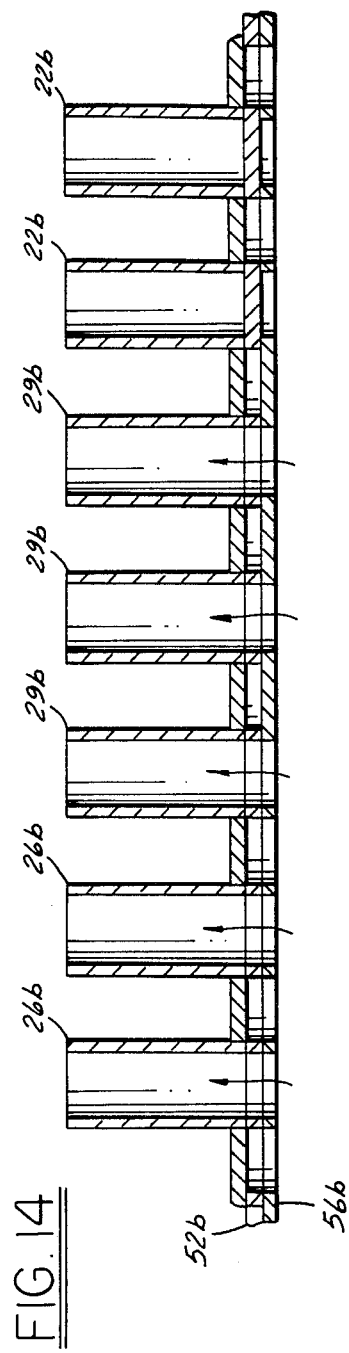

MULTIPLE ZONE HEATING OF MOLDS

BACKGROUND OF THE INVENTION (1) Field of the Invention

This invention relates to a mold assembly for molding hollow thin-walled articles from a heat-fusing material such as vinyl plastisol by slush or dry molding and more particularly to such a mold assembly wherein hot and cold gas is used to regulate the mold wall temperature.

Various vinyl plastisol compositions are known and used in various slush molding methods in various assemblies for performing those methods. Typically, an open hollow mold is filled with liquid plastisol or covered by dry plastisol and heat is applied to the mold surface and transferred to the liquid or dry plastisol to gel a layer of plastisol adjacent the mold surface. The thickness of the gelled layer depends upon the temperature to which the plastisol layer is subjected and the time the plastisol is maintained at that temperature. After the layer adjacent the mold surface is gelled, the ungelled plastisol is dumped or poured out of the mold.

(2) Description of the Prior Art

In one well-known method, the mold temperature is maintained relatively low to prevent gelling as a very thin initial layer or coating of plastisol is applied to the mold to prevent bare spots and to prevent the entrapment of air bubbles, thereby providing a thin coating which strictly conforms to the mold configuration. Such a coating is applied by filling and emptying the mold. For example, automotive dashboard or instrument panel covers are made in this fashion and the molds frequently include details to define imitation stitching in the finished product as well as undercuts and other intricate detail. The very thin coating is first applied to conform to the mold and to prevent irregularities in the outer surface of the finished product. After this very thin coating is applied, the mold is again filled with additional plastisol and the entire mold is heated to gel the plastisol and increase the thickness of the finished product. After the desired thickness is attained, the mold is again dumped or emptied and thereafter the mold is subjected to additional heat for curing the product.

An example of such a method and an assembly for practicing same is shown in the U.S. Pat. No. 3,728,429 granted to Daniel E. Colby, Philip E. Rogers and Frederick J. Sliwinski on Apr. 17, 1973 and assigned to the assignee of the subject invention. That patent discloses such a method for slush molding articles wherein the mold is heated by the exterior surfaces thereof being exposed to impinging streams of hot gas and, after the product is finished, the mold is cooled by being subject to cooling water from water spray nozzles, after which the fused finished article is stripped from the mold. In addition, an endless conveyor moves a plurality of molds through various stations in the performance of the method. Although the method and assembly shown in this patent have proven to be very satisfactory, there are disadvantages such as the open flame adjacent the molds, which produces the hot gas for heating of the molds, and the use of water or liquid for cooling the molds and which can be incompatible with the plastisol. Further, the assembly, because of its long conveyor and multiple molds, is suited for long runs of a plastisol of a particular color but is not well suited for short runs or quick or efficient changeovers.

Other methods of heating in a slush molding process have been utilized in the prior art; for example, the molds may be moved through heating ovens as exemplified in U.S. Pat. No. 3,002,230 granted to J. W. Stewart on Oct. 3, 1961. Alternatively, the molds may be subjected to induction heaters as exemplified in U.S. Pat. No. 3,315,016 granted to John M. Wersosky and Donald A. Moore on Apr. 18, 1967 and assigned to the assignee of the subject invention. Another method for heating the mold is exemplified in U.S. Pat. No. 3,680,629 granted to Laurent R. Gaudreau and Floyd E. McDowell on Aug. 1, 1972 and assigned to the assignee of the subject invention. That patent teaches the heating of a mold by incorporating tubes in the mold and flowing a heated fluid such as steam through the tubes for heating the mold. It is also known in the slush molding art to heat the mold by such tubes for conveying liquid through the mold wherein there are multiple circuits of the tubes with each circuit having an inlet and an outlet, but with each circuit subjected to the same fluid medium, i.e., the same temperature.

One of the problems associated with the prior art methods is that in many articles which are manufactured by slush molding where the mold is filled with plastisol, some areas of the filled mold are at a lower liquid level of the plastisol and are salvage or trim areas which are not used in the final product and therefore do not require the thickness of the other finished areas in the product. Yet, when the entire mold surface is heated uniformly the entire finished article has approximately the same thickness even though some areas are trim or non-usable. There is known in the slush molding art the technique of varying the thickness by heating different areas of the mold to a higher degree to increase the thickness of the article in certain areas. Such a technique is exemplified in U.S. Pat. No. 2,588,571 granted to Sydney Porter on Mar. 11, 1952. That patent discloses the technique of slush molding a boot by utilization of infrared lamp heating and shielding the heating from certain portions of the mold to prevent the build-up of the plastisol thickness and to increase the thickness of the sole of the boot by increased heating.

U.S. Ser. No. 673,810 filed Nov. 11, 1984, with a common assignee, discloses an assembly controlling the thickness of an article made by the slush molding process or dry plastic casting process in a mold having first and second groups of gas passages defined by gas jet nozzles disposed adjacent the mold surface with dampers for controlling the temperature of respective first and second areas of the mold surface.

SUMMARY OF THE INVENTION

The subject invention provides an improved valve assembly with two drive cylinder positioned valve plates for controlling the thickness of an article made by the slush molding process in a mold having first and second impingement jet distribution means and a gas heating and cooling system for controlling the temperature over respective first and second areas of the mold surface. The first group of impingement jet nozzles are disposed adjacent the first area of the mold surface where it is desired to increase the thickness of the finished article whereas the second group of impingement jets is disposed adjacent the second area of the mold surface where the material in the finished article is scrapped and/or will be trimmed and therefore the desired thickness is desirably less. The first and second groups of impingement jet nozzles are supplied with gas by regulating the cylinders to position the valve plates thereby to control the temperature of the first and second areas of the mold surface at a non-gelling temperature as plastisol is disposed over the mold surface to define a coating or layer. This very thin coating of plastisol is applied to be free of surface blemishes. Thereafter, additional plastisol is provided for increasing the thickness only over the first area of the mold surface. To accomplish this, the valve plates are positioned so that hot gas flows through first group of impingement jet nozzles to heat the first area of the mold surface to a higher temperature than the second area so as to gel the plastisol over the first area of the mold surface. The use of flat plates and impingement heating and cooling is adaptable to inexpensive mold fabrication with selective control of mold heating and cooling to produce thinner thickness in the molded article at a second region which is scrap or trim areas of the molded article.

PRIOR ART STATEMENT

The U.S. Pat. No. 3,728,429 discussed above discloses a slush molding process wherein the mold is heated by being subjected to hot gases and cooled by being subjected to cooling water and wherein the molds move on an endless conveyor through various stations. There is no suggestion in that patent of the subject inventive concept of utilizing first and second groups of gas jets for differential heating of the mold for controlling the thickness of the article formed therein to avoid excessive material waste at scrap or trim points on the mold. Furthermore, there is no suggestion of utilizing a hot and cold gas distribution system as suggested by the subject invention wherein a mold is heated and cooled by gas flow through an inlet plenum of the mold which supplies both sets of jets and wherein the mold includes a return plenum thereon. The above-mentioned U.S. Pat. No. 3,680,629 suggests the use of liquid passages adjacent the mold surface for controlling the temperature of the mold, however, there is no suggestion in that patent of using first and second sets of impingement jets arranged to produce different temperatures at first and second regions of a mold. As alluded to above in regard to U.S. Pat. No. 2,588,571, the technique of varying the thickness by differential heating is known in the slush molding art, however, such is accomplished by infrared heating. There has been no recognition in the prior art of the advantages of differentially heating and cooling the surfaces of the mold used in the slush molding process by utilizing different groups of impingement jets adjacent the mold surface and a control means for sequentially supplying those jets with gas flow at different temperatures. Other processes using hot gas to mold plastic parts are set forth in U.S. Pat. Nos. 3,578,066; 3,590,435; 3,492,307; 3,416,193 and 3,388,429. However, none of the processes use cylinder controlled, flat valve plates for controlling flow in impingement jets for distribution across a mold surface.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a fragmentary, bottom elevational view looking in the direction of arrows 3—3 of FIG. 1;

FIGS. 5–7 are diagrammatic sectional views of different operating positions of the valve apparatus of FIG. 1;

FIGS. 11–14 are diagrammatic sectional views of a two-plate valve apparatus having three heat zones and four heating phases.

DESCRIPTION OF PREFERRED EMBODIMENT

Figure 1:
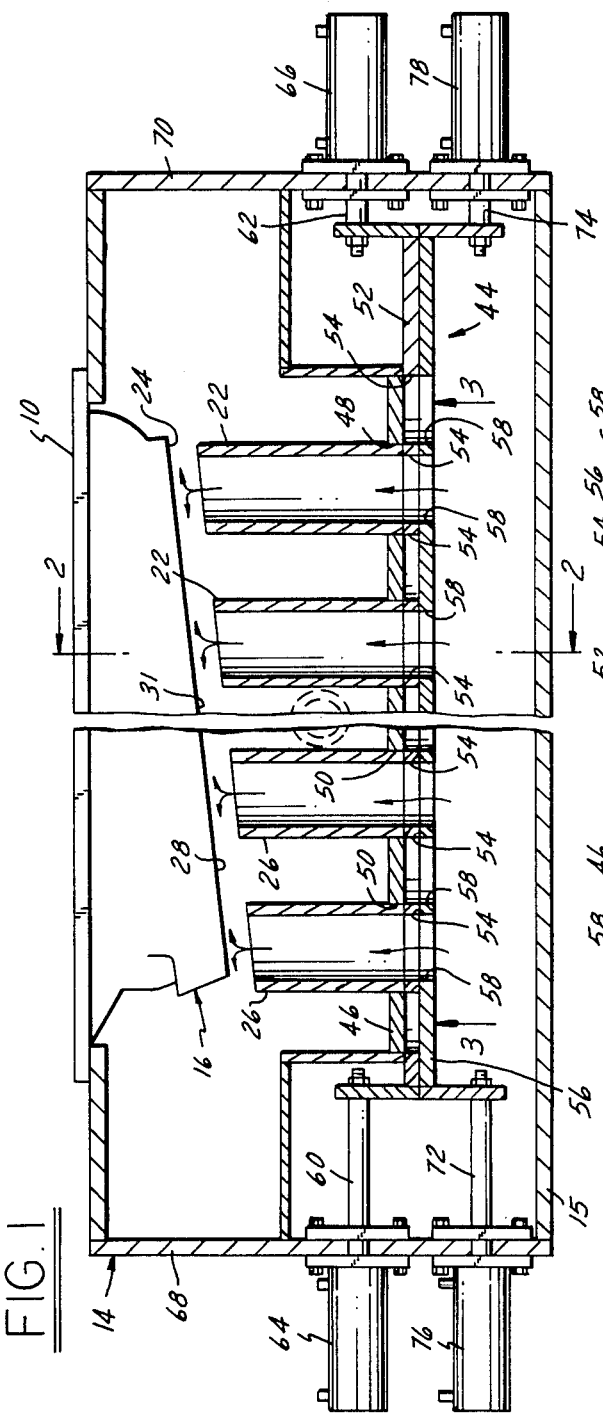
FIG. 1 is a diagrammatic view of a preferred embodiment of a mold and plenum with a two-plate valve apparatus constructed in accordance with the subject invention.
Figure 2:
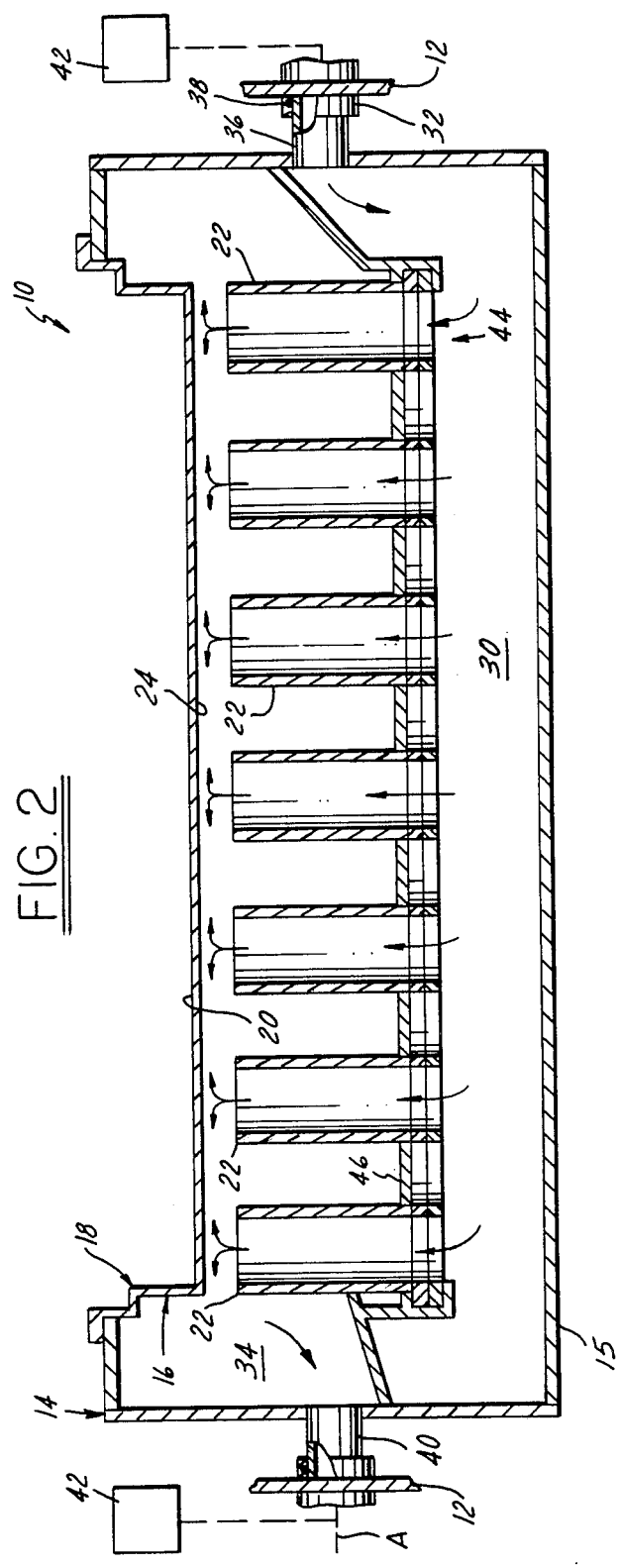
FIG. 2 is a cross section taken along line 2—2 of FIG. 1 looking in the direction of the arrows.
Figure 4:
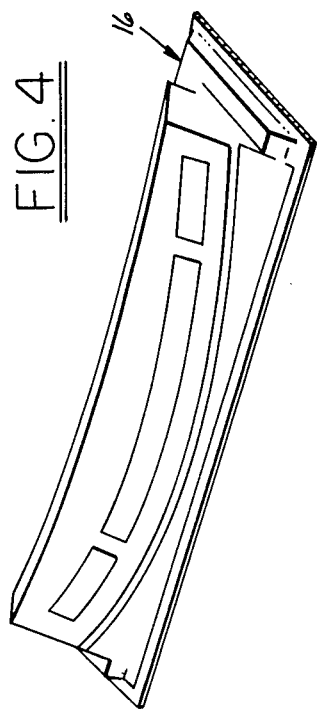
FIG. 4 is a perspective view of the backside of the mold in FIG. 1.

FIGS. 1–3 show an assembly generally indicated at 10 and constructed in accordance with the subject invention. As shown in FIG. 2, the assembly 10 includes a stationary pedestal generally indicated at 12 for rotatably supporting a mold support means generally indicated at 14. The pedestal 12 rotatably supports the mold support means for rotation about the axis A—A. The mold support means 14 includes a mold heating and cooling box 15 which receives and supports a mold 16. The mold 16 has a mold cavity 18 defining a mold surface 20.

Suitable liquid or dry plastic sources to distribute plastic onto the mold surface 20 to form a thin plastic part are more specifically set forth in co-pending U.S. application Ser. No. 673,810 filed Nov. 1, 1984.

As best shown in FIG. 1, the mold 16 has a molding surface 20 on the interior thereof which must be heated for the liquid plastisol or dry plastic to gel. A first set of impingement nozzles 22 is disposed adjacent the mold surface over a first finish area 24 of the mold backside of mold 16 for controlling the temperature over the first area 24 of the mold surface. Additionally, a second set of air impingement nozzles 26 is disposed adjacent the mold backside surface over a second area 28 of the mold surface for controlling the temperature at the second finish area 28. A third set of nozzles 29 direct heating and cooling gas to a waste area 31.

An inlet plenum 30 has an inlet sleeve 32. A return plenum 34 collects gas from the air impingement jets 22,26. More specifically, an inlet fluid conduit 36 passes through seal 38 at sleeve 32 to supply the inlet plenum 30. An outlet conduit 40 passes through a like seal to communicate with return plenum 34. Inlet and outlet conduits 36,40 are connected to a hot and cold air system 42 through regulating damper valves as more specifically described in the aforementioned U.S. Ser. No. 673,810.

A certain condition must exist between the gas flow and the mold surfaces 24,28 in order to produce the necessary heat-up rates and mold temperatures during the operating cycle. Convective heat transfer coefficients are achieved by forcing the gas to impinge the back surface of the mold electroform in a uniform pattern. The convective heat transfer coefficients resulting from this pattern are relatively equal across the entire mold surface, thus producing uniform heating and cooling.

The air flow rate, air temperature, the nozzle diameters, their spacings, and their distance to the mold surface areas 24,28,31 are the main variables which can be adjusted to produce selective heating and cooling of mold surface areas 24,28,31. In one embodiment, round copper tubes are provided of a diameter and length calculated to direct an impingement jet against the mold to spread through a short flow path on the surface of the mold thereby to produce relatively high heat transfer rates.

In the embodiment of FIGS. 1-3 a dual zone heating/cooling control is produced by a two-plate valve assembly 44. The assembly 44 includes a plenum divider plate 46 in which a first plurality of flow passages 48 are formed to receive nozzles 22 and a second plurality of flow passages 50 are formed to receive nozzles 26. A first valve is formed as a thin plate 52 of reduced thermal mass. Plate 52 covers divider plate 46 and includes a set of spaced holes 54 that are arranged to control communication through nozzles 22,26. A second thin plate 56 overlies plate 52 and is in juxtaposed relationship therewith. Plate 56 includes a second array of holes 58 that are arranged to be selectively positioned in alignment or out of alignment with flow passages to each of the nozzles 22,26.

Each of the plates 52,56 are pulled into control positions, to be described, so as to maintain the plates under tension thereby to avoid compression buckling. More particularly, plate 52 has drive shaft 60,62 at each side thereof. Each shaft 60,62 is connected, respectively, to drive cylinders 64,66, each of which is fixed to side walls 68,70 of the box 15. Plate 56 has drive shafts 72,74 at each side thereof. Each shaft is connected respectively to drive cylinders 76,78. Cylinders 76,78 are fixed respectively to side walls 68,70. The cylinders are selectively pressurized to position plate 52 at one of two positions to produce three heating phases shown in FIGS. 5-6. The plates 52,56 are disposed in a parallel disposition so that static pressure in plenum 30 will tend to keep them tight against the nozzle openings.

FIG. 5 shows the plates 52,56 positioned in a gel phase so that hot air can only flow to the finish areas 24,28 of the mold. In this position the solid segments of plate 52 block flow through the nozzles 29 to the waste area 31. Consequently, the plastisol gels less on the waste area while it builds up as a greater gel thickness on the finish areas of the mold.

FIG. 6 illustrates the alignment of the plates 52,56 which permits hot (or cold) air to flow to all surfaces of the mold for "fusion" or "cooling". This is accomplished by moving plate 52 to the left a distance equal to one half the nozzle-to-nozzle centerline spacing. Since the "waste" area 31, as noted before, will be at some lower temperature than the "finish" area, because of not having been heated as long, it can be brought up to the full "fusion" temperature by indexing plate 56 to the left as shown in FIG. 7. This blocks air flow to the "finish" areas 24,28 and permits the "waste" area 31 to come up to temperature.

When "cooling" is called for, plate 56 is shifted back to the right and all nozzles have access to the cold air.

The above valve action is predicated on valve movement corresponding to a nozzle-to-nozzle spacing of a little more than twice the inside diameter of the nozzles.

The same two-plate valving configuration can be used for heating three different areas. Here a different pattern of valve plate holes is utilized and a higher gel temperature can be obtained for critical areas, such as welt lines or beads. The plates 52a,56a are initially positioned to the left.

Figure 8:
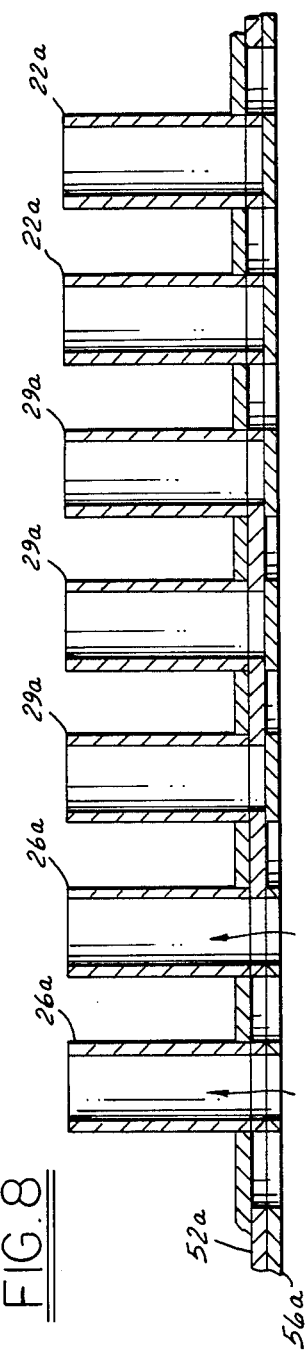
FIGS. 8–10 are diagrammatic sectional views of a two-plate valve apparatus including three heating zones.
Figure 9:
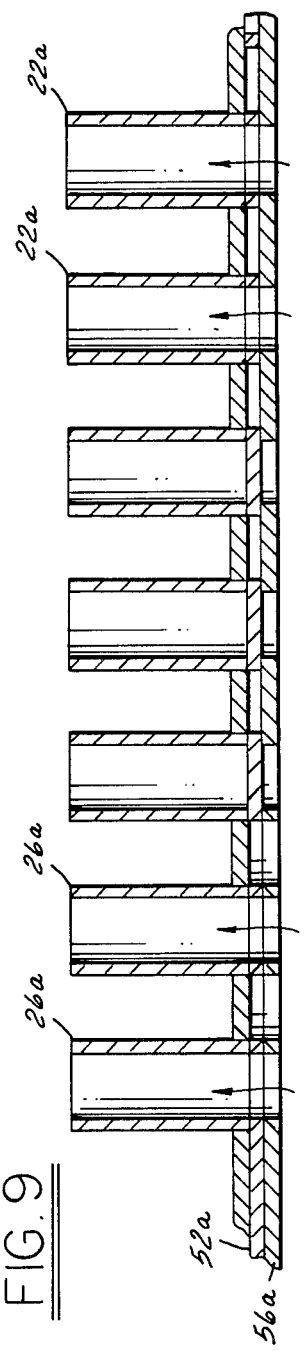
Figure 10:
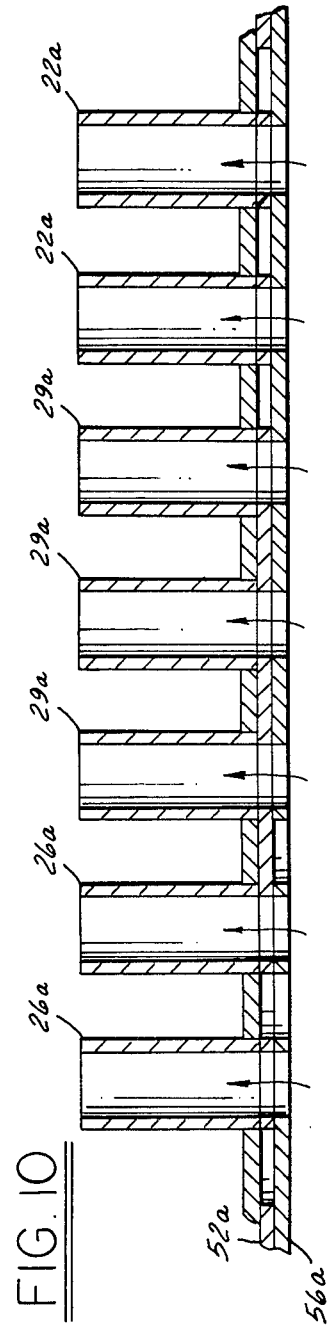

As illustrated in FIGS. 8-10, the "bead" area can be heated first by positioning plates 52a,56a as shown in FIG. 8 so as to allow hot air flow through nozzles 26a against a bead area where greatest gel build-up is desired. Then the two plates 52a,56a are shifted to the right (FIG. 9) to permit hot air to flow to the "finish" area nozzles 22a, as well. The waste area nozzles 29a are still blocked. Finally, plate 52a is shifted back to the left permitting air to flow to all three areas for "fusion" and "cooling" as shown in FIG. 10.

FIGS. 11-14 illustrate an additional control that can be obtained by a different hole pattern in the two plates. In this embodiment there are more holes in the plate hole pattern which not only reduces the total thermal mass of the plates because of more perforations per unit area but it also provides another measure of temperature control to provide additional heat to the bead area in products in which it can be tolerated. The reduced thermal mass means that heat flow to and from the valve apparatus components will not appreciably affect the heating and cooling of the mold per se.

In FIG. 11, valve plates 52b,56b are shown initially to the left. The hole pattern (more open compared to earlier embodiments) allows hot air flow initially only to a bead area through nozzles 26b to build up a first gel layer at the bead. In FIG. 12, the valve plate 52b is shown moved to the right. This opens both bead area nozzles 26b and finish area nozzles 22b during a further gel period in which hot air is directed through the open nozzles to build up more plastisol on the bead and an initial gel thickness on the finish area.

During a third control phase (shown in FIG. 13) valve plate 52b remains in the right position and 56b is moved to the right. This opens all the nozzles 50 so that the mold can be brought up to an even temperature during either fusion or cooling.

In the fourth phase shown in FIG. 14, plate 52b is returned to its start position as shown in FIG. 11 to add additional heat to the waste area and the bead if desired.

As will be appreciated, by preventing the build-up of the thickness of the finished article in the waste areas of the finished article which may be trimmed or which may not be used, a great deal of plastisol may be reused and recirculated and does not end up on the finished article, thereby providing a significant savings in material costs.

What is claimed is:
1. An assembly for molding an article of heat-fusing plastisol material comprising; a mold having a mold surface and a backside surface, a plenum plate having openings therein, first and second sets of nozzles, each nozzle having an inlet end received in one of said openings, said first set of nozzles having jet outlets disposed adjacent the mold backside surface to direct a heating or cooling gas from said first set of nozzles to produce short flow paths of said gas flow across said backside surface over a first area thereof for controlling the temperature over said first area of the mold backside surface, said second set of nozzles having jet outlets disposed adjacent the mold backside surface over a second area thereof for producing short flow paths of a heating or cooling gas thereacross for controlling the temperature over said second area of the mold backside surface, and slide valve means including first and second thin plates having openings therein, said plates being slidable relative to each other and said plenum plate such that said openings may be selectively aligned with said nozzle inlet ends for controlling flow of said gas through said first and second sets of nozzles in a first operative position for maintaining the temperature of one of said first and second areas at a non-gelling temperature below that required to gel any appreciable thickness of the heat-fusing material and for heating another of the areas of said mold surface to a higher temperature than said first area for gelling material on a portion of the mold surface, said plates having a second operative position maintained during both fusion and cooling phases of operation wherein either heated gas or cooling gas is directed through all nozzles in both of said sets of nozzles whereby all areas of the mold are heated to a like fusion temperature or to an even cooling temperature for removal of fused parts from the mold.

2. In the combination of claim 1, means for sliding each of said first and second thin plates including a drive shaft on each end of each plate, and drive cylinders connected to each of said drive shafts including means operable to oppositely reciprocate each of said plates by exerting a pull force thereon so as to prevent buckling thereof during the selective control.

3. In the combination of claim 1, said nozzle inlet ends and said plate holes being alignable in a gel phase position to direct gas flow from the nozzles onto only a portion of the mold backside surface and wherein one of said plates blocks flow to a waste area on the mold so that plastisol only gels build-up on a portion of the mold surface, said plates having a second operative position maintained during both fusion and cooling phases of operation wherein holes in both plates are aligned to cause either heated gas or cooling gas to be directed through all nozzles in both of said sets of nozzles whereby all areas of the mold are heated to a like fusion temperature or to an even cooling temperature for removal of fused parts from the mold.

4. In the combination of claim 1, a third set of openings in said plenum plate, a third set of nozzles for directing heating or cooling fluid to a third mold backside surface region for forming a bead of plastisol in the molded product, said first and second plates including a predetermined array of openings therethrough, said openings being selectively arrangable so as to block flow through all of said nozzles except said third set of nozzles whereby higher gel temperatures are produced initially on the third mold backside surface region for formation of a gel build-up in the molded product to form a raised bead on the molded product.

5. In the combination of claim 1, said predetermined array of openings reducing the thermal mass of said thin valve plates by including a flow opening in one of said plates at each nozzle diameter spacing in all but two nozzle positions of said one of said plates.

* * * * *